(12) United States Patent
Knoblauch

(10) Patent No.: US 8,336,655 B2
(45) Date of Patent: Dec. 25, 2012

(54) ELECTRICAL AXLE ASSEMBLY

(75) Inventor: Daniel Knoblauch, Untergruppenbach (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 387 days.

(21) Appl. No.: 12/683,403

(22) Filed: Jan. 6, 2010

(65) Prior Publication Data

US 2010/0187026 A1    Jul. 29, 2010

(30) Foreign Application Priority Data

Jan. 28, 2009   (DE) .................. 10 2009 006 523

(51) Int. Cl.
    *B60K 1/02*   (2006.01)
(52) U.S. Cl. .................. 180/65.6; 903/909; 477/3
(58) Field of Classification Search .............. 180/65.1, 180/65.6; 903/906, 909, 911; 477/2, 3
    See application file for complete search history.

(56) References Cited

U.S. PATENT DOCUMENTS

| 5,168,946 A | 12/1992 | Dorgan |
| 2006/0037792 A1* | 2/2006 | Boss et al. .................. 180/65.6 |
| 2009/0014223 A1 | 1/2009 | Jones et al. |

FOREIGN PATENT DOCUMENTS

| DE | 195 40 067 A1 | 4/1997 |
| DE | 199 54 544 A1 | 11/1999 |
| DE | 10 2005 020 415 A1 | 11/2006 |
| WO | WO 2004/016459 A1 | 2/2004 |

OTHER PUBLICATIONS

Automotive Newsfront; by Dan McCosh; Popular Science; No. 1, New York; Jul. 1991; p. 37-38.
European Search Report; Application No. EP 09 18 0781.

* cited by examiner

*Primary Examiner* — John Walters
(74) *Attorney, Agent, or Firm* — Knobbe, Martens, Olson & Bear, LLP

(57) ABSTRACT

An electrical axle assembly for a motor vehicle comprises a first electric machine, which is rotationally fixed to a first input shaft, and a second electric machine, which is rotationally fixed to a second input shaft. The first input shaft and the second input shaft are arranged coaxially along an input axle. The axle assembly further comprises a first output shaft, which can be connected to a first driving wheel, and a second output shaft, which can be connected to a second driving wheel. The first output shaft and the second output shaft are arranged coaxially along an output axle. Further, they are connected to the associated input shaft via at least one transmission stage, in such a way that the driving wheels can be driven independently of one another by the electric machines. At least one of the shafts here has a bearing journal, which is radially supported in an axial bore of a shaft coaxial therewith.

15 Claims, 3 Drawing Sheets

ELECTRICAL AXLE ASSEMBLY

CROSS REFERENCE TO RELATED APPLICATIONS

This application claims priority of German patent application DE 10 2009 006 523, filed Jan. 28, 2009.

The present invention relates to an electrical axle assembly for a motor vehicle, comprising a first electric machine, which is rotationally fixed to a first input shaft, a second electric machine, which is rotationally fixed to a second input shaft, the first input shaft and the second input shaft being arranged coaxially along an input axle, a first output shaft, which can be connected to a first driving wheel, and a second output shaft, which can be connected to a second driving wheel, the first output shaft and the second output shaft being arranged coaxially along an output axle and each being connected to the associated input shaft via at least one transmission stage, in such a way that the driving wheels can be driven independently of one another by the electric machines.

Electrical axle assemblies for motor vehicles have become ever more important in recent years. One approach is to combine an electric machine with an internal combustion engine, in order to transmit drive power to the power wheels. Purely electrical drives, which comprise an electric motor and a transverse differential, which serves to distribute the electrical drive output to the two driving wheels, are also known.

Also known under the term 'tandem motors' are drive concepts in which two electric machines are assigned to a powered axle of a vehicle, the electric machines driving the two driving wheels of this axle independently of one another. A mechanical differential is not needed here. The electrical axle assemblies of this type are generally constructed symmetrically about a longitudinal axis of the vehicle. Sometimes the electric machines are arranged centrally in a transverse direction and connected to the driving wheels via suitable drive shafts. So-called wheel hub motors, in which the electric machines are incorporated into the respective driving wheel, are also known, however.

BACKGROUND OF THE INVENTION

Against this background, an object of the invention is to specify a motor vehicle electrical axle assembly of compact overall dimensions, which is cost-effective to produce.

In the case of the aforementioned electrical axle assembly, this is achieved in that at least one of the shafts comprises a bearing journal, which is radially supported in an axial bearing bore of a shaft coaxial therewith.

This measure, whereby two coaxial shafts are connected to a shaft arrangement via a bearing journal and a bearing bore instead of being arranged independently side by side, affords considerable advantages in terms of overall space and cost savings, particularly in respect of the bearing support.

Combining the coaxial shafts in one shaft arrangement furthermore makes it possible to simplify the housing of the electrical axle assembly.

The term bearing bore is here taken to mean any common form of axial depression, which may have different diameters over the axial length.

The electrical axle assembly can in this case be used for an axle of a motor vehicle, for example a rear axle, a front axle or for both axles. One single such electrical axle assembly is sufficient to drive a motor vehicle. This axle assembly may also be combined with a further drive device on the other vehicle axle, however, in order to create an all-wheel drivetrain. The other drive unit here may comprise a conventional internal combustion engine.

The object is thereby achieved in full.

According to a preferred exemplary embodiment the bearing journal is supported in the bearing bore by at least one needle-roller bearing.

In general terms this bearing may be any other bearing that is designed for relatively low differential speeds between the bearing journal-shaft and the bearing bore-shaft. This is because whilst the vehicle is underway these two shafts generally rotate synchronously and in mobile operation differential speeds occur relatively rarely, for example when cornering. Consequently no elaborate bearings are needed for the relative bearing support between the bearing journal-shaft and the bearing bore-shaft.

The bearing journal is preferably supported in the bearing bore by two bearings, in particular needle-roller bearings, separated by an axial interval from one another.

According to a further preferred embodiment the bearing journal-shaft has a shoulder section, an axial bearing being arranged between the shoulder section and the bearing-bore shaft.

In other words, the bearing journal-shaft and the bearing bore-shaft are axially supported against one another via an axial bearing such as an axial needle-roller bearing or roller bearing.

The axial bearing is designed to absorb axial forces between the two coaxial shafts. One single such axial bearing is here sufficient for the shaft arrangement.

According to a further preferred embodiment the shaft arrangement comprising the bearing journal-shaft and the bearing bore-shaft is supported on a housing by two shaft bearings.

Although the two shafts of this shaft arrangement generally serve to drive different driving wheels independently of one another, these shafts through the bearing journal/bearing bore arrangement form a common shaft arrangement, which can be supported on a housing by means of just two shaft bearings. This consequently obviates the need to support each of these shafts by two shaft bearings of their own. Accordingly the number of relatively expensive shaft bearings for this shaft arrangement can be kept to a minimum. Where needle-roller bearings are used for the relative bearing support between the bearing journal-shaft and the bearing bore-shaft, these are relatively inexpensive, since for one thing these have to transmit smaller loads and for another they only transmit lower differential speeds.

The shaft bearings serve in particular to absorb radial forces and generally also axial forces.

It is furthermore advantageous if the input shafts are each connected to the output shafts via a gear set, the gear sets being arranged symmetrically about a longitudinal axis.

It is also advantageous here if the bearing journal extends into the bearing bore at least up to the gear set which is located on the bearing bore-shaft.

A large axial overlap is thereby achieved between the bearing journal and the bearing bore, so that the bearing bore-shaft and the bearing journal-shaft act together as a unified shaft arrangement.

For this reason it is also preferable for the bearing journal to extend into the bearing bore at least up to a shaft bearing which serves to support the bearing bore-shaft on a housing.

By doing this, forces exerted on the bearing bore-shaft by the bearing journal in this area can be transmitted in a radial direction directly into the shaft bearing. This obviously applies all the more if the free end of the bearing journal is supported inside the bearing bore by means of a needle-roller bearing or some other bearing which is substantially radially aligned with to the outer shaft bearing.

According to a further preferred embodiment a parking position gear is fixed to each of the coaxial shafts.

There is sufficient space available in an axial direction, particularly if the coaxial shafts, as a common shaft arrangement, are supported on a housing by just two shaft bearings, to provide such parking position gears on the shafts. The arrangement of the input shafts moreover affords favourable scope for the accommodation of a parking mechanism.

It is particularly advantageous in this case if the parking position gear is in each case arranged between a shaft bearing, which serves to support the input shaft on a housing, and a gear wheel which is connected to the output shaft.

This embodiment presents itself particularly when the input shafts are each connected to the output shafts via an intermediate shaft.

It is generally feasible for each of the input shafts to be connected to the output shafts via a single transmission stage.

It is particularly advantageous, however, if the input shafts are in each case connected via a first transmission stage to a respective one of a first and a second intermediate shaft, these shafts in each case being connected to the respective output shafts via a second transmission stage.

In this embodiment it is possible to distribute the requisite overall transmission ratio to two transmission stages. Consequently the gear wheels, particularly those arranged on the output shafts, may have a relatively small diameter, so that restrictions on the overall space typically existing in this area can be complied with.

It is furthermore advantageous overall if the input shafts are connected to the output shaft via at least a first and a second gear set, the first gear set and the second gear set being of symmetrical design about a longitudinal axis, in such a way that axial forces resulting from the tooth engagements cancel each other out.

A symmetrical arrangement of the gear sets is accordingly also taken to mean that any helical toothing systems of the gear wheels are symmetrical, like those in a herringbone gearing, and the axial forces due to the helical toothing engagement cancel each other out, at least when transmitting the same torque to the two driving wheels.

It is also advantageous overall if the axle assembly has a two-part housing, the two housing parts of which are substantially symmetrical about a longitudinal axis.

Such a strictly two-part configuration is possible, particularly if each of the coaxial shafts of the electrical axle assembly is in each case nested one inside the other through a bearing journal/bearing bore, so that the shaft assemblies thus created are in each case supported on the housing by just two shaft bearings. If each of the coaxial shafts were to be supported by two shaft bearings of its own, a middle housing bearing plate would have to be provided for the adjacent shaft bearings of the two coaxial shafts, so that the housing would have to be of at least three-part construction.

It is furthermore advantageous overall if the bearing journal and the bearing bore are of a conically tapering design.

This allows the shafts to be optimized for the load stresses, particularly in an axial direction. In other words it serves to prevent excessive stresses occurring due to the flexural loads at certain points.

It is particularly advantageous here if the outside diameter of the bearing journal in the area of its point of origin is equal to the outside diameter of the bearing bore-shaft at the point where this is supported on a housing by means of a shaft bearing.

A compact overall shaft arrangement comprising the bearing journal-shaft and the bearing bore-shaft can thus be created not only in an axial direction but also in a radial direction.

According to a further preferred embodiment the bearing bore has an oil feed aperture in the area of the free end of the bearing journal.

Oil can be delivered through the oil feed aperture into the space between the bearing bore and the bearing journal for the bearing(s) situated therein, in particular the needle-roller bearings arranged therein. If the bearing bore and the bearing journal are of a tapered design narrowing towards the free end of the bearing journal, the centrifugal forces acting in the intermediate space can be used to lubricate all bearings for the relative support of the bearing bore-shaft and the bearing journal-shaft, that is to say not only the needle-roller bearings serving as radial bearings but also any axial bearing between the bearing bore-shaft and the bearing journal-shaft.

Overall the electrical axle assembly affords at least one of the following advantages:

It results in compact dimensions, especially smaller axial intervals and gear diameters. The electrical axle assembly can consequently be used in many applications both on the front axle and on the rear axle.

The absence of a middle housing part means that the housing may comprise just two housing parts.

In terms of construction the main bearing support for the shafts by means of the shaft bearings corresponds to a single drive. This reduces the number of (expensive) shaft bearings.

The bearings for the relative support of the bearing journal-shaft and the bearing bore-shaft experience only the differential speeds between the two drives (for example when cornering). This applies both to the radial bearings and also to the axial bearing(s). These can consequently be embodied as relatively simple needle-roller bearings. This results overall in a simple construction and easy assembly. Moreover there is more overall space available for the parking mechanism components.

It will be obvious that the aforementioned features and those yet to be explained below may be used not only in the particular combination specified but also in other combinations, or individually, without departing from the scope of the present invention.

BRIEF SUMMARY OF THE INVENTION

Exemplary embodiments of the invention are represented in the drawing and will be explained in more detail in the following description. In the drawing.

DETAILED DESCRIPTION OF PREFERRED EMBODIMENTS

Figure 1:
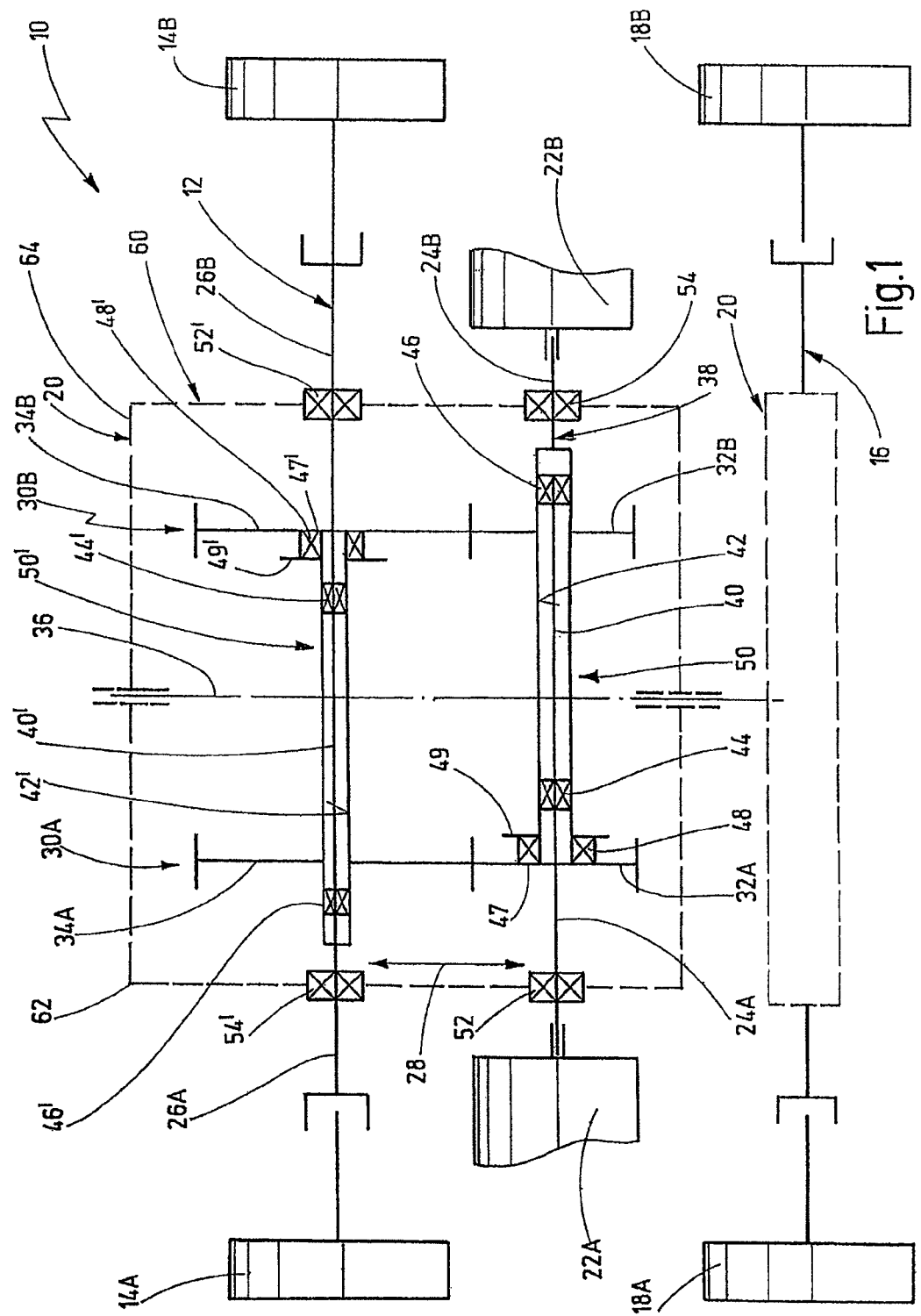
FIG. 1 shows a schematic arrangement of a motor vehicle comprising a first embodiment of an electrical axle assembly according to the invention.

In FIG. 1 a motor vehicle such as a passenger car is represented in schematic plan form and is denoted by 10. The motor vehicle 10 has a front axle 12 with front wheels 14A, 14B and a rear axle 16 with rear wheels 18A, 18B.

In this case the motor vehicle 10 is driven purely electrically. Here an electrical axle assembly, by means of which the front wheels 14A, 14B can be driven independently of one another, is assigned to the front axle 12. The rear axle 16 is in this case equipped with an identical axle assembly 20, which is indicated only schematically in FIG. 1. It goes without saying, however, that alternative motor vehicles have only a single power axle, so that the front axle or the rear axle is not powered. Alternatively it is also possible to use the electrical axle assembly 20 in connection with an axle drive on the other axle having an internal combustion engine.

The electrical axle assembly 20 comprises a first electric machine 22A and a second electric machine 22B, which are connected to respective input shafts 24A, 24B of the electrical axle assembly 20. The electrical axle assembly 20 further comprises two output shafts 26A, 26B, which are connected to the input shafts 24A, 24B via a transmission stage 28. The transmission stage 28 comprises a first gear set 30A, which connects the first input shaft 24A to the first output shaft 26A. A second gear set 30B connects the second input shaft 24B to the second output shaft 26B. The gear sets 30 each comprise a first gear 32, which is fixed to the respective input shaft 24, and a second gear 34, which is fixed to the respective output shaft 26.

A longitudinal axis of the motor vehicle is shown at 36. The electrical axle assembly 20 is generally designed to be symmetrical about this longitudinal axis 36. In particular the electric machines 22 are aligned perpendicular to the longitudinal axis 36 and face one another. The input shafts 24A, 24B are arranged concentrically with one another and aligned approximately perpendicular to the longitudinal axis 36. The same applies to the output shafts 26A, 26B.

Two shaft bearings could be provided to support each of the individual shafts 24A, 24B, 26A, 26B, so that a total of eight shaft bearings would have to be provided in order to support these shafts on a housing. In this case, however, the shafts coaxial with one another are nested one inside another, so that they can in each case be jointly supported by means of just two shaft bearings.

For this purpose the first input shaft 24A comprises a bearing journal 40, which is supported in a bearing bore 42 of the second input shaft 24B. The relative support for the two input shafts 24A, 24B inside the bearing bore 42 is here preferably achieved by bearings, which do not have to accommodate high differential speeds. This is because when the motor vehicle 10 is travelling in a straight line the two electric machines 22A, 22B are driven at the same speed, so that the differential speed is zero. A speed differential occurs essentially in cornering and the like. The bearing journal 40 is therefore in this case supported inside the bearing bore 42 by means of a first needle-roller bearing 44 and a second needle-roller bearing 46. The two needle-roller bearings 44, 46 are embodied as shaft radial bearings and in the main do not have to absorb any axial forces.

In order to absorb axial forces between the first input shaft 24A and the second input shaft 24B an axial bearing in the form of a third needle-roller bearing 48 is provided. This axial bearing 48 is here arranged between a shoulder section 47 of the bearing journal-shaft 24A and a shoulder section 49 of the bearing bore-shaft 24B.

Through the arrangement described the first input shaft 24A and the second input shaft 24B form a shaft arrangement 50, which at its outer circumference can be supported on a housing 60 by means of two shaft bearings 52, 54.

The shaft bearings 52, 54 are each arranged further away from the longitudinal axis 36 than the respectively adjacent gear sets 30A, 30B.

The housing 60 is in this case of two-part design and comprises a first housing part 62 and a second housing part 64. The two housing parts 62, 64 each comprise a flanged section and are connected to one another approximately in the area of the longitudinal axis.

FIG. 1 furthermore shows that the output shafts 26A, 26B are similarly nested one inside the other like the input shafts 24A, 24B. The corresponding elements of the output shafts 26A, 26B are therefore provided with the same reference numerals 40 to 54 as the corresponding elements on the input shafts 24A, 24B, except that the reference numerals on the output shafts 26A, 26B are each provided with an apostrophe. Furthermore on the output shaft arrangement 50' the bearing journal-shaft 26B and the bearing bore-shaft 26A are transposed from left to right. This is only an option, however; the shaft arrangement 50' may also be of identical construction to the shaft arrangement 50 of the input shafts 24A, 24B.

The bearing journals 40, 40' in each case extend at least so far into the bearing bore 42, 42' that the bearing journal is situated radially inside the gear wheel 32B or 34A of the respective bearing bore-shaft 24B or 26A. The forces introduced into the shaft arrangement 50, 50' by these gear wheels can therefore be effectively supported.

Figure 2:
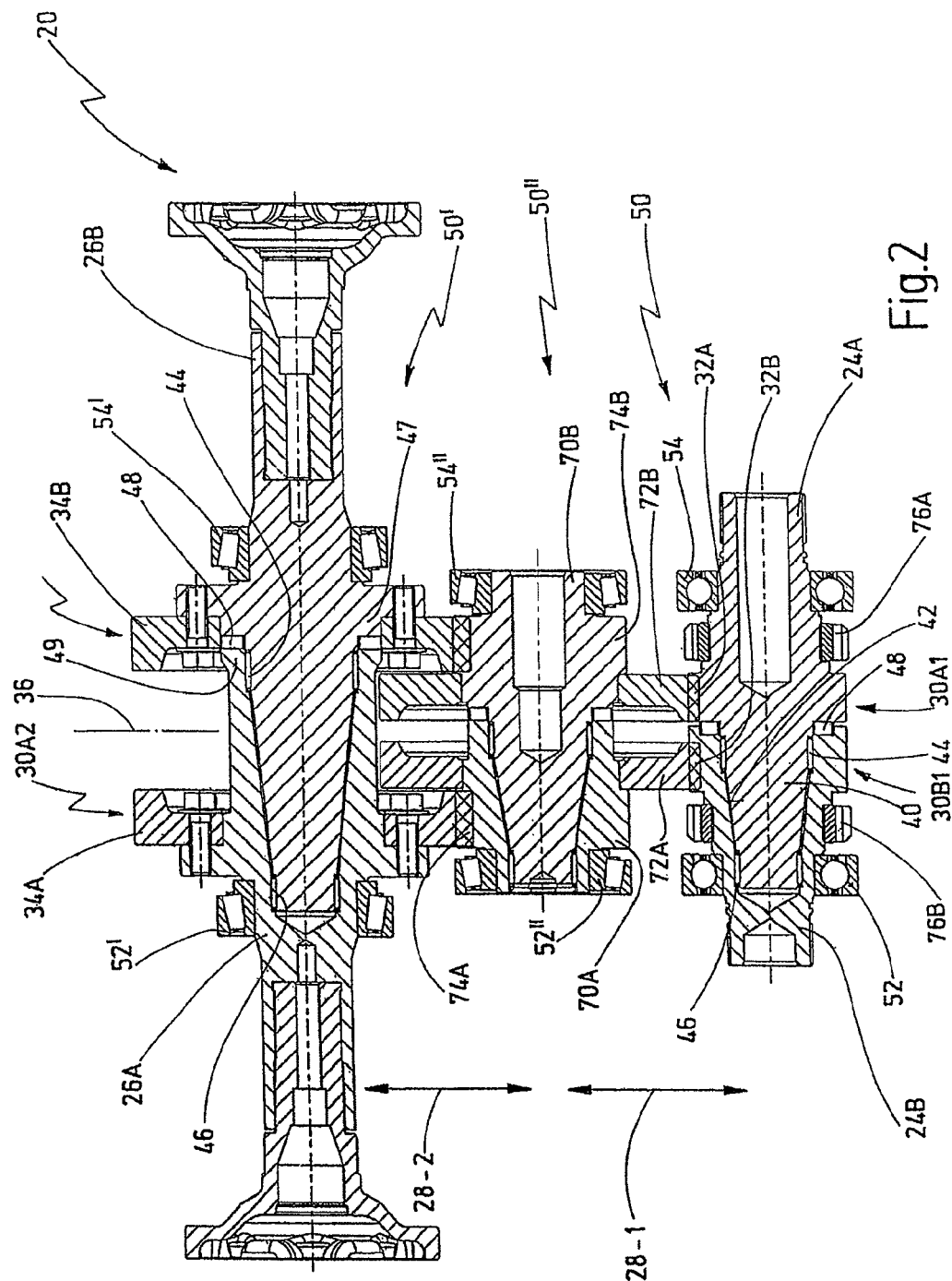
FIG. 2 shows a sectional view of a further embodiment of an electrical axle assembly according to the invention.

FIG. 2 shows a further embodiment of an electrical axle assembly 20 according to the invention. In its construction and working principle this corresponds generally to the axle assembly 20 in FIG. 1. The same elements are therefore provided with the same reference numerals. Only the differences will be explained below.

For one thing the axle assembly 20 in FIG. 2 is characterized in that the input shafts 24A, 24B are connected to the output shafts 26A, 26B by a first transmission stage 28-1 and a second transmission stage 28-2. For this purpose a pair of intermediate shafts 70A, 70B is provided between the input shafts 24A, 24B and the output shafts 26A, 26B. The first intermediate shaft 70A here has a first intermediate gear 72A, which meshes with a gear 32B of the second input shaft 24B. The first intermediate shaft 70A furthermore has a second intermediate gear 74A, which meshes with a gear 34A of the first output shaft 26A. The second intermediate shaft 70B correspondingly has a first intermediate gear 72B, which meshes with a gear 32A of the first input shaft 24A. The second intermediate shaft 70B furthermore has a second intermediate gear 74B, which meshes with a gear 34B of the second output shaft 26B.

The first intermediate gears 72A, 72B are here arranged immediately adjacent to the longitudinal axis 36, whereas the second intermediate gears 74A, 74B are arranged at a distance from the longitudinal axis 36. On the first input shaft 24A, in axial alignment with the second intermediate gear 74B, there is consequently overall axial space available between the gear 32A and the second shaft bearing 54. In the axle assembly 20 a parking position gear 76A is arranged in this space. Similarly a second parking position gear 76B is arranged on the second input shaft 24B between the first shaft bearing 52 and the gear 32B.

The two intermediate shafts 70A, 70B likewise form a shaft arrangement 50'', which is supported on a housing (not shown in FIG. 2) by means of a first shaft bearing 52'' and a second shaft bearing 54''.

Each of the shaft arrangements 50, 50', 50'' furthermore in each case has a bearing journal 40 and a bearing bore 42. The bearing journals 40 are here in each case assigned to the right-hand shaft (relative to the longitudinal axis 36), that is to say to the input shaft 24A, the second intermediate shaft 70B and the second output shaft 26B. The bearing bores are correspondingly provided in the shafts 24B, 70A, 26A.

The bearing journals 40 are here in each case of conically tapering design and supported in conically tapering bearing bores 42. The bearing journals 40 and the bearing bores 42 each have axially aligned sections in the area of the bearing support by the shaft bearings 44, 46, as can be seen from FIG. 2.

The bearing journals 40 in each case extend so far that an end of the bearing journal 40 is in each case situated radially in the area of the first shaft bearing 52, 52', 52". Consequently flexural forces can be even better absorbed than in the case of the shaft arrangements 50, 50' in FIG. 1. The shaft bearings 52', 54' are provided in an X arrangement and are each prestressed in an axial direction. The same applies to the shaft bearings 52", 54". The bearings 52, 54 are not necessarily provided in an X arrangement.

The fact that the speeds of the electric machines 22A, 22B are geared down to the output shafts 26A, 26B via two transmission stages 28-1, 28-2 means that the diameter of the gears 34A, 34B on the output shafts 26A, 26B can be relatively small, particularly in comparison to a single-stage transmission arrangement as in the embodiment in FIG. 1.

The bearing journals 40, each of tapering design, are so thick or have such a diameter in the area of their point of origin that this diameter is approximately equal to the outside diameter of the associated bearing bore-shaft and/or bearing journal-shaft in the area of the respective shaft bearing 52 and 54.

Figure 3:
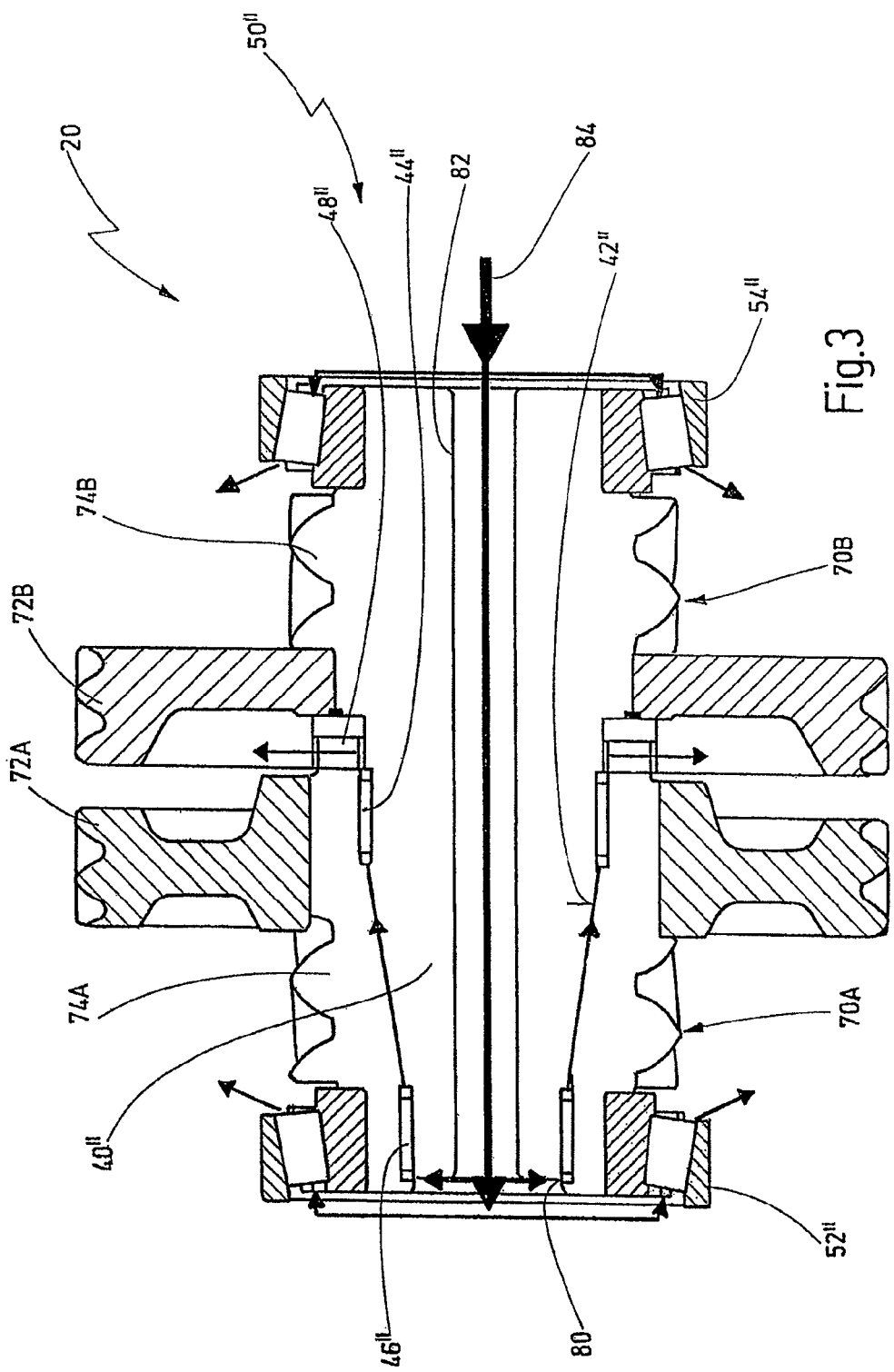
FIG. 3 shows a sectional view of a further embodiment of an electrical axle assembly according to the invention.

FIG. 3 shows a further embodiment of an electrical axle assembly 20 according to the invention. To be more precise, FIG. 3 represents an alternative embodiment of an intermediate shaft arrangement having a bearing bore-shaft 70A and a bearing journal shaft 70B.

The intermediate shaft arrangement corresponds generally to the intermediate shaft arrangement in FIG. 2. Identical elements are therefore provided with the same reference numerals. For the most part only the differences will be explained below.

It will be seen, for example, that the intermediate space between the bearing journal 40" and the bearing bore 42" is lubricated via an oil feed aperture 80, which is provided in the area of the free end of the bearing journal 40". The lubricating oil entering there serves firstly for lubricating the needle-roller bearing 46", which supports the free end of the bearing journal 40". Under the centrifugal forces the oil is then delivered radially outwards to the other needle-roller bearing 44", which supports the point of origin of the bearing journal 40". The oil is then fed further through the axial bearing 48" and consequently also lubricates the latter.

The oil emerging therefrom can then be collected again and fed to a tank.

The oil is here preferably delivered via a central bore 82 in the bearing journal-shaft 70B, as is shown at 84. The oil delivered to the one axial end of the bearing journal-shaft 70B may serve here not only for lubrication of the bearings which support the bearing journal-shaft 70B and the bearing bore-shaft 70A relative to one another. The oil delivered may also serve for lubricating the shaft bearings 52", 54", as shown in FIG. 3. Consequently it is possible to implement a simple lubrication concept in which the oil is fed centrally to a respective shaft arrangement (for example by means of an oil pump or oil-collecting ribs). One oil feed 84 per shaft arrangement is sufficient here to lubricate all bearings that serve to support the shaft arrangement, particularly since the stepping of the bearings makes it possible to rely on the centrifugal force or gravitational force.

Although the lubrication concept represented in FIG. 3 is shown in respect of an intermediate shaft arrangement 50" comprising the bearing journal-shaft 70B and the bearing bore-shaft 70A, it will be appreciated that the same lubrication concept can also be correspondingly used for a further shaft arrangement or further shaft arrangements 50, 50' of the electrical axle assembly.

What is claimed is:

1. Electrical axle assembly for a motor vehicle, comprising a first electric machine, which is rotationally fixed to a first input shaft, a second electric machine, which is rotationally fixed to a second input shaft, the first input shaft and the second input shaft being arranged coaxially along an input axle, a first output shaft, which can be connected to a first driving wheel, and a second output shaft, which can be connected to a second driving wheel, the first output shaft and the second output shaft being arranged coaxially along an output axle and each being connected to the associated input shaft via at least one transmission stage, in such a way that the driving wheels can be driven independently of one another by the electric machines,
wherein at least one bearing-journal shaft of the shafts has a bearing journal, which is radially supported in an axial bearing bore of a bearing-bore shaft coaxial therewith.

2. Electrical axle assembly according to claim 1, wherein the bearing journal is supported in the bearing bore by at least one needle-roller bearing.

3. Electrical axle assembly according to claim 1, wherein the bearing journal-shaft has a shoulder section, an axial bearing being arranged between the shoulder section and the bearing-bore shaft.

4. Electrical axle assembly according to claim 1, wherein a shaft arrangement comprising the bearing journal-shaft and the bearing bore-shaft is supported on a housing by two shaft bearings.

5. Electrical axle assembly according to claim 1, wherein the input shafts are each connected to the output shafts via a gear set, the gear sets being arranged symmetrically about a longitudinal axis.

6. Electrical axle assembly according to claim 5, wherein the bearing journal extends into the bearing bore at least up to the gear set, which is located on the bearing bore-shaft.

7. Electrical axle assembly according to claim 1, wherein the bearing journal extends into the bearing bore at least up to a shaft bearing, which serves to support the bearing bore-shaft on a housing.

8. Electrical axle assembly according to claim 1, wherein a parking position gear is fixed to each of the input shafts.

9. Electrical axle assembly according to claim 8, wherein the parking position gear is in each case arranged between a shaft bearing, which serves to support the input shaft on a housing, and a gear wheel, which is connected to the output shaft.

10. Electrical axle assembly according to claim 1, wherein the input shafts are in each case connected via a first transmission stage to a respective one of a first and a second intermediate shaft, these shafts in each case being connected to the respective output shaft via a second transmission stage.

11. Electrical axle assembly according to claim 1, wherein the input shafts are connected to the respective output shafts via at least a respective one of a first and a second gear set, the first gear set and the second gear set being of symmetrical design about a longitudinal axis, in such a way that axial forces resulting from the tooth engagements cancel each other out.

12. Electrical axle assembly according to claim 1, wherein the axle assembly has a two-part housing, the two housing parts of which are substantially symmetrical about a longitudinal axis.

13. Electrical axle assembly according to claim 1, wherein the bearing journal and the bearing bore are of a conically tapering design.

14. Electrical axle assembly according to claim 13, wherein an outside diameter of the bearing journal, in an area of a point of origin of the bearing journal, is at least one of equal to the outside diameter of the bearing-bore shaft at a point where the bearing-bore shaft is supported on a housing by means of a shaft bearing and to the outside diameter of the bearing-journal shaft at a point where the bearing-journal shaft is supported on a housing by means of another shaft bearing.

15. Electrical axle assembly according to claim 1, wherein the bearing bore has an oil feed aperture in the area of the free end of the bearing journal.

\* \* \* \* \*